July 21, 1936.  W. G. LOGUE  2,048,015
AIRCRAFT AERIAL AND CONTROL
Filed Jan. 10, 1935
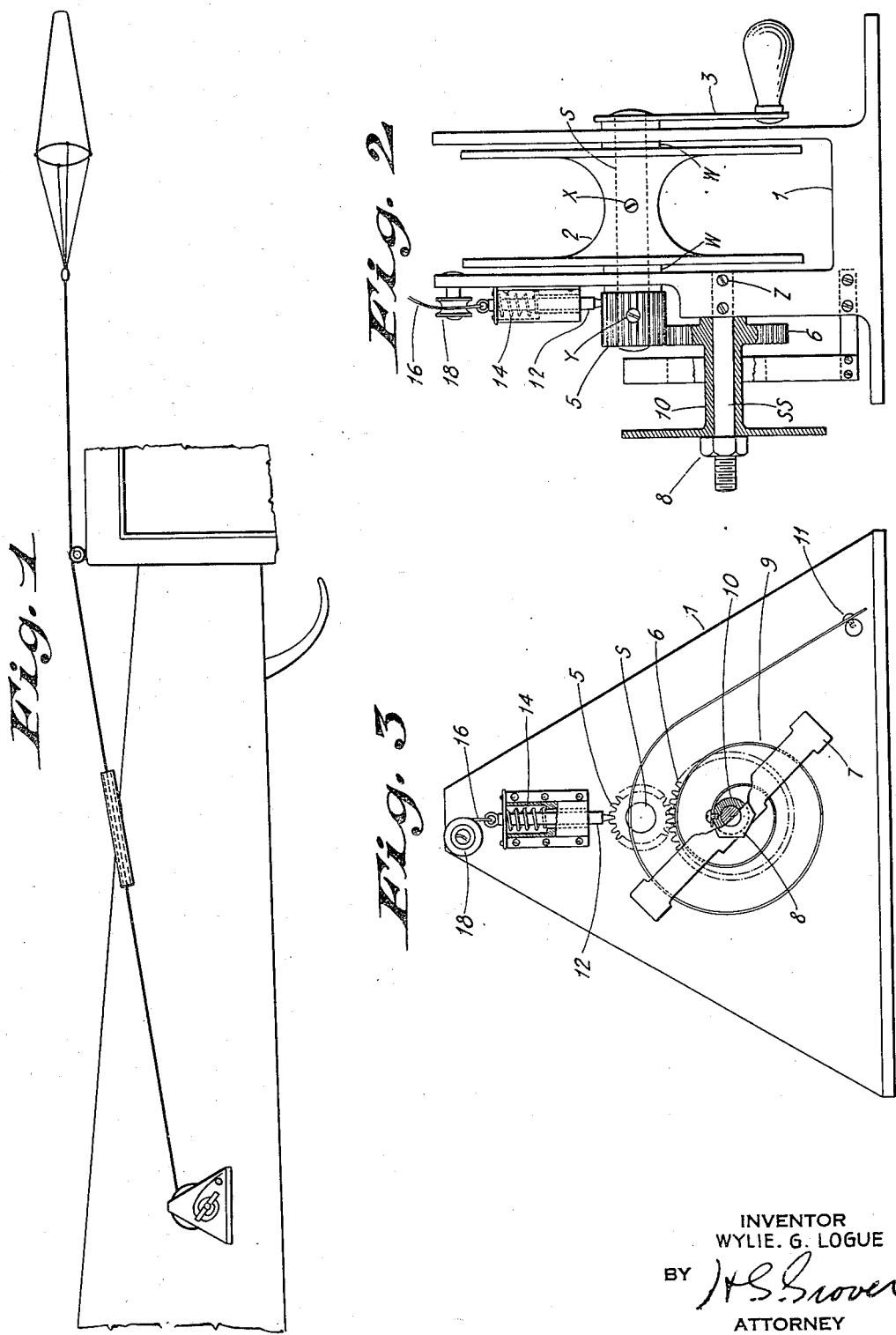
INVENTOR
WYLIE. G. LOGUE
BY H. S. Grover
ATTORNEY Patented July 21, 1936

2,048,015

UNITED STATES PATENT OFFICE 2,048,015

AIRCRAFT AERIAL AND CONTROL

Wylie G. Logue, Mineola, N. Y., assignor to Radio Corporation of America, a corporation of Delaware Application January 10, 1935, Serial No. 1,094

7 Claims. (Cl. 250—33)

This invention relates to an aerial system to be utilized on aircraft. The aerial may be utilized for receiving or transmitting radiant energy. By the term "aircraft" as used hereinafter throughout the specification, I means lighter or heavier-than-air craft.

At one stage in the development of aircraft cruising speeds of about 100 miles an hour were the standard. Later the cruising speed of heavier-than-air craft was raised somewhat to say about 125 miles an hour. Recently the cruising speeds of aircraft has been raised to about 200 miles per hour. At the lower cruising speeds, the aircraft antenna system often comprised a conductor or conductors connected between supports on the wing tips of the plane and the fin adjacent the steering rudder. In many other cases an antenna of the pole type was used. These antennae were satisfactory and remained a standard until aircraft cruising speeds increased above about 125 miles an hour from which speeds or upwards such antenna became a large factor in reduction of speed due to wind resistance, drag, etc. In order to eliminate this additional wind resistance, trailing wire antennae are used in spite of their deficency electrically because they are more favorable as regards wind resistance than the fixed antenna. In many cases these trailing antennae comprise a linear conductor drawn out behind the plane during its travel by means of its own weight or by means of what has been termed a "fish". What has been termed a "fish" is a weight of some form. The trailing antenna has become an accepted standard to a certain extent today. Weights are dangerous and unsatisfactory since they often fall off or strike objects in the path of the plane and are torn loose with or without the aerial. In addition to the danger of such use, the replacement cost is quite high.

The trailing antennae when used without a weight are allowed to trail at all times both on the ground and in the air, and during landings and take-offs. The trailing antenna is very satisfactory in operation but it wears out extremely fast from movement of the aircraft on the ground and in touching the ground during the landing and take-off. Maintenance cost is therefore high since the standard trailing antenna lasts for comparatively few hours.

An object of the present invention is to provide an aerial of the trailing wire type which is efficient in operation, and the use of which is not attended by difficulties such as mentioned briefly above.

The above object and others are accomplished in accordance with the present invention by utilizing a trailing antenna wire one terminal of which is connected to a spring biased reel, and the other terminal of which is connected to a wind-sock. The tension of the spring in the reel is adjusted in such a manner that the length of the antenna exposed is commensurate with the speed of the craft. When the craft is on the ground, the reel may be regulated to wind the antenna in so that little or none of it is exposed. The antenna therefore cannot trail on the ground. As the plane takes off and gains speed, the wind-sock draws the antenna out against the spring tension an extent determined by the pull on the wind-sock and consequently the speed at which the plane is traveling. Means is also provided whereby the antenna may be locked in any extent of exposure or may be reeled in or out by hand.

The novel features of my invention have been pointed out with particularity in the appended claims. The nature of my invention and the manner in which the same is carried out will be better understood by the following description thereof when read in connection with the attached drawing in which:

Fig. 1 illustrates diagrammatically the essential features of an antenna system for use on aircraft, and one manner of arranging said antenna system on the fuselage of a plane;

Fig. 2 shows the details of the antenna reel illustrated diagrammatically in Fig. 1, while Fig. 3 is a view of the antenna reel of Fig. 2 when observed from the left hand side thereof.

As shown in Fig. 1, the antenna may comprise a linear conductor which for convenience passes from the reel through a fair lead or guide in the aircraft fuselage to extend away from the tail thereof. The antenna conductor may be further guided by means of a pulley or frictionless guide mounted on the fin of the plane above the rudder. The terminal of the linear conductor may be connected as shown to one terminal of a swivel, the other terminal of which may be connected as shown to a wind-sock.

The reel may comprise a main casting or housing 1 which consists of a strong light weight metal, such as duralumin or aluminum, containing bronze bearings in which a steel shaft S is rotated and to which the insulated winding form 2 is secured by means of a deeply countersunk locking screw X. To one end of this shaft is attached an auxiliary handle 3 for reeling the wire or conductor in and out by hand for test purposes etc. To the other end of the shaft S is attached the main driving gear 5. The gear 5 is locked by a screw Y to that portion of the shaft S which extends beyond the housing. The form 2 is as shown spaced from the housing uprights by washers W, as shown.

When in position for automatic operation, the driving gear 5 engages a separately mounted spring gear 6 as shown more clearly in Fig. 3. This latter gear turns on a steel shaft SS which is locked into the housing at Z and is fitted with a collar or hollow shaft 10 to which the inner end of a spiral spring 9 is secured as shown in Fig. 3. The outer end of this spring 9 is secured to the housing at 11. In order to adjust the spring tension to compensate for various air speeds and wind-sock sizes, a spring adjustment handle 7 with locking nut 8 is provided arranged as shown. To increase or decrease spring tension, the locking nut is backed-off from the spiral threaded end of SS a sufficient distance to permit the disengagement of the teeth on the two main gears 5 and 6, and the spring 9 may then be turned or tensioned by hand in the direction desired. The gears 5 and 6 are then re-engaged by pressure on the adjusting handle 7 and the lock nut 8 on the spiral threads is tightened against the handle 7.

The arrangement as described above will when the spring is properly tensioned maintain an antenna extended to the extent desired when the plane is cruising at normal speeds and to a greater extent at higher speeds, and to a less extent at lower speeds. When the plane lands or stops, the reel will wind the antenna up so that little or none thereof extends from the fuselage.

Under certain circumstances, the operator may wish to lock the antenna in the "reeled-out" or "reeled-in" position or at some intermedate position. This may be accomplished in accordance with the present invention by means of a lock consisting of a pointed steel pin 12 engaging the teeth of the driving gear 5 under action of a coil steel spring 14. The position of the steel pin 12 may be remotely controlled by means of a steel wire 16 operating over pulleys including 18 or through a flexible shaft from any convenient point adjacent the operator. To control the antenna by this remote control, the pin 12 is disengaged from between the teeth of gear wheel 5 by applying tension to the wire 16. By fastening the wire 16 in the tensioned position, the pin 12 may be maintained disengaged from the gear wheel 5.

The winding form 2 may be of insulated material or it may be of metal. In the latter case, the entire wheel would be "hot" and the base should then be insulated. If the winding form is of insulated material, connection to the radio instruments may be made through a brush connection resting on the antenna wire at any convenient point.

By showing the reel in a certain position, applicant does not intend to be limited thereby since, obviously, the reel may be moved to different points in the aircraft fuselage and may be positioned in different manners at the desired point.

I claim:

1. In combination, a reel to be used for carrying and controlling the extent to which a linear conductor is wound thereon, an air-drag member attached to the outer end of said conductor, a spool member to which said conductor is attached, a gear connected to said spool, a second gear in mesh with said first named gear, and means including a spring motor connected with said second gear and operative to produce such a winding torque on said spool as to balance the variable effect of said air-drag member on the degree of extension of said conductor.

2. In an aircraft antenna and control device therefor, a flexible linear conductor, a wind-drag member attached to the trailing end of said conductor, a reel mounted on board the aircraft and having one end of said linear conductor attached thereto, and means including a spring motor operatively connected to said reel for permitting said conductor to be payed out and retracted in dependence upon the wind resistance of said drag member.

3. A device in accordance with claim 2 and having a gear train for interconnecting said spring motor and said reel.

4. A device in accordance with claim 2 and having a locking device for at times restraining said reel for turning.

5. In combination with a linear aerial for use on board an aircraft, a reel operative to wind and unwind said aerial, means including a coiled spring for urging said reel to wind up said aerial, and means including a drag member attached to the outer end of said aerial and operative in dependence upon the variable speed of said aircraft while in flight for variably determining the extent to which said aerial shall be payed out.

6. In a device for holding and controlling an aircraft antenna, a spool member, a linear conductor one end of which is attached to said spool member, an element offering resistance to air flow attached to the other end of said conductor, and means including a coiled spring and a gear train mechanically associated with said spool member and operative to permit said antenna to be payed out by said spool member when the pull of said air-flow resistance element increases and to rewind said antenna on said spool member when the pull of said air-flow resistance element is lessened.

7. In a device of the class described, an antenna of the trailing type, means for winding and unwinding said antenna, means attached to the trailing end of said antenna and operative in dependence upon wind pressure for exerting a variable pull on the trailing end of said antenna, and resilient means reactive to said variable pull for urging said winding means to wind up said antenna when the pull is lessened and for permitting the antenna to be payed out when the pull is increased.

WYLIE G. LOGUE.